(12) United States Patent
Fujishima et al.

(10) Patent No.: US 9,397,544 B2
(45) Date of Patent: Jul. 19, 2016

(54) ELECTROMAGNETIC PUMP COMPENSATION POWER SUPPLY APPARATUS AND ELECTROMAGNETIC PUMP SYSTEM

(75) Inventors: Yasushi Fujishima, Fukui (JP); Rie Aizawa, Kanagawa (JP); Jun Ito, Kanagawa (JP); Fusao Saito, Kanagawa (JP); Kenji Katsuki, Kanagawa (JP); Ryoichi Sugawara, Kanagawa (JP); Tetu Suzuki, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 429 days.

(21) Appl. No.: 14/123,644

(22) PCT Filed: Jun. 22, 2012

(86) PCT No.: PCT/JP2012/004064
§ 371 (c)(1),
(2), (4) Date: Dec. 3, 2013

(87) PCT Pub. No.: WO2013/001768
PCT Pub. Date: Jan. 3, 2013

(65) Prior Publication Data
US 2014/0091746 A1    Apr. 3, 2014

(30) Foreign Application Priority Data

Jun. 27, 2011  (JP) ................... 2011-141521

(51) Int. Cl.
*H02K 19/00* (2006.01)
*H02K 19/38* (2006.01)
(Continued)

(52) U.S. Cl.
CPC ............... *H02K 19/00* (2013.01); *F04B 17/04* (2013.01); *H02K 7/025* (2013.01); *H02K 7/125* (2013.01); *H02K 16/00* (2013.01); *H02K 19/38* (2013.01); *H02K 21/024* (2013.01); *H02K 21/028* (2013.01); *G21C 15/247* (2013.01); *H02K 44/04* (2013.01); *H02K 2213/06* (2013.01); *H02K 2213/09* (2013.01); *Y02E 60/16* (2013.01)

(58) Field of Classification Search
CPC ...... H02K 19/00; H02K 19/38; H02K 21/028
USPC ......................................... 318/538
See application file for complete search history.

(56) References Cited

U.S. PATENT DOCUMENTS

| | | | |
|---|---|---|---|
| 3,469,130 A | 9/1969 | Jines et al. | |
| 3,862,038 A * | 1/1975 | Takeuchi | G01N 30/24 210/198.2 |

(Continued)

FOREIGN PATENT DOCUMENTS

| | | |
|---|---|---|
| DE | 10 2006 036 986 A1 | 4/2008 |
| EP | 0 386 366 A2 | 9/1990 |

(Continued)

*Primary Examiner* — Kawing Chan
(74) *Attorney, Agent, or Firm* — Foley & Lardner LLP

(57) ABSTRACT

Provided, in parallel to an electromagnetic pump in a power supply system, is an electromagnetic pump compensation power supply mechanism (10) that will perform a power-factor improving function as a synchronous machine during normal operation of a plant. The electromagnetic pump compensation power supply mechanism (10) is provided with an exciter stator permanent magnetic apparatus (45) that can switch an exciter between a non-excited state and an excited state. The exciter stator permanent magnet apparatus (45) comprises exciter stator permanent magnets (15a), springs (16) that apply force to the exciter stator permanent magnets (15a) towards positions facing an exciter rotor winding (15b), and electromagnetic solenoids (20) that make the exciter stator permanent magnets (15a) move to positions not facing the exciter rotor winding (15b) in resistance to the force applied by the springs (16).

11 Claims, 6 Drawing Sheets

(51) Int. Cl.
*H02K 21/02* (2006.01)
*H02K 16/00* (2006.01)
*F04B 17/04* (2006.01)
*H02K 7/02* (2006.01)
*H02K 7/12* (2006.01)
*H02K 44/04* (2006.01)
*G21C 15/247* (2006.01)

(56) References Cited

U.S. PATENT DOCUMENTS 4,412,600 A * 11/1983 Ito .......................... B66B 1/405
　　　　　　　　　　　　　　　　　　　　187/275
4,949,362 A 8/1990 Gaubatz
2003/0137196 A1 * 7/2003 Liran ..................... H02J 9/08
　　　　　　　　　　　　　　　　　　　　307/64

FOREIGN PATENT DOCUMENTS

| | | |
|---|---|---|
| FJ | 2007-259587 A | 10/2007 |
| GB | 2 354 557 A | 3/2001 |
| JP | 55-166443 A | 12/1980 |
| JP | 62-196030 A | 8/1987 |
| JP | 02-254375 A | 10/1990 |
| JP | 03-073891 A | 3/1991 |
| JP | 05-142382 A | 6/1993 |
| JP | 2001-178023 A | 6/2001 |
| JP | 2011-176969 A | 9/2011 |

* cited by examiner

ELECTROMAGNETIC PUMP COMPENSATION POWER SUPPLY APPARATUS AND ELECTROMAGNETIC PUMP SYSTEM

TECHNICAL FIELD

The present invention relates to an electromagnetic pump compensation power supply apparatus and an electromagnetic pump system for improving a low power factor of an electromagnetic pump and having required electric power output characteristic.

BACKGROUND ART

In a fast reactor that uses metal sodium as coolant, an electromagnetic pump is employed to circulate the coolant.

Making use of the fact that liquid metal sodium is a good conductor of electricity; the electromagnetic pump is designed to transport the metal sodium coolant based on the principle that the electromagnetic pump receives a force in proportion to a magnetic field strength thereof in a direction perpendicular thereto when the electromagnetic pump through which a current flows is placed in a magnetic field.

The electromagnetic pump has excellent characteristics compared with a conventional mechanical pump. In terms of functionality, flow rate of coolant can be easily and linearly adjusted. In terms of structure, it is possible to keep the coolant in a completely sealed state. Because the electromagnetic pump is small in size, the electromagnetic pump may be combined with another apparatus, such as steam generator, for the purpose of streamlining. The electromagnetic pump does not have moving parts, and is therefore easy to maintain and repair. And electromagnetic pump is possible obtain a high discharge pressure.

When abnormality, such as plant trip or loss of offsite power, occurs in a running fast reactor, a function of ensuring flow rate during a predetermined period of time after shutdown of the reactor, i.e. flow coast down characteristic function, is required to mitigate a transitional coolant temperature difference at an inlet and outlet of a reactor core that is generated as a control rod is quickly inserted into the core of the reactor.

As described above, when the control rod is quickly inserted into the core, core outlet temperature would increase if the flow rate through the core decreases more rapidly relative to the degree of attenuation of heat removal from the core. In order to mitigate the above, the attenuation speed of the flow rate needs to be consistent with the amount of heat generation. Such a characteristic is known as flow coast down characteristic.

The flow coast down characteristic is important not only in terms of safety in avoiding an increase in the core outlet temperature, but also in terms of ensuring soundness in mitigating structural-material temperature change, i.e. mitigating plant thermal transient in a system, particularly in a sodium-cooled reactor where a heat transfer rate between coolant sodium and structural material is high.

As for the function of ensuring a flow rate during a predetermined period of time after shutdown of the reactor, flow coast down characteristic function, some kind energy storage needs to be separately prepared to ensure an attenuating output characteristic of an electromagnetic pump because the electromagnetic pump has no rotating parts and no mechanical inertia.

Moreover, the electromagnetic pump is an extreme inductive load, and power factor thereof therefore is about 0.5, which is smaller than power factor of a conventional mechanical sodium pump.

In the case that the electromagnetic pump is used as a pump requiring large capacity such as a coolant circulation pump of a fast reactor, driving power supply capacity thereof would become massive unless a power factor correction means is provided to compensate reactive power. As a result, the problem is that it is difficult to lay out power equipment, and design work could be complicated, so the use of the pump would become disadvantageous from an economical point of view.

As mentioned above, as an energy storage means that can ensure the flow coast down characteristic to mitigate plant thermal transient and improve a low power factor of the electromagnetic pump at the same time, there is a method of using a superconduction energy storage apparatus, and supplying to the electromagnetic pump via a power converter control apparatus from energy stored in a superconductive electromagnet as disclosed in Patent Document 1 for example.

A synchronous machine connected parallel to the electromagnetic pump may be operated as a phase modifier during normal operation of a plant. When abnormality such as cutting-off of a power supply circuit of the electromagnetic pump has occurred, as disclosed in Patent Document 2 for example, there is a method of regenerating an excitation current from rotation energy, and supplying the excitation current to the electromagnetic pump.

PRIOR ART DOCUMENTS

Patent Documents

Patent Document 1: Japanese Patent Application Laid-Open Publication No. 05-142382
Patent Document 2: Japanese Patent Application Laid-Open Publication No. 03-73891

SUMMARY OF THE INVENTION

Problems to be Solved by the Invention

In the above-described conventional example, during a flow coast down operation to mitigate the plant thermal transient at a time when a plant trip, loss of offsite power, or the like has occurred, in order to obtain an attenuation output characteristic required for an electromagnetic pump that is applied to a main circulation pump of a fast reactor, a control circuit is used for an electromagnetic pump compensation power supply apparatus.

However, in order to obtain safety functions, the control circuit needs to be diversified, multiplexed, or made redundant in other ways; a measure for ensuring testability during operation of a reactor, and other measures are required. However, there is no precedent for applying to a safety system of the above kind of excitation control circuit, and the problem is how to ensure reliability.

Therefore, the object of the present invention is to provide a highly-reliable electromagnetic pump compensation power supply apparatus and an electromagnetic pump system that include a function of carrying out reactive power compensation to improve a low power factor of an electromagnetic pump during normal operation of a plant, and to have a required electric power output characteristic without being controlled from outside.

Means for Solving the Problem

According to an embodiment, there is provided an electromagnetic pump compensation power supply apparatus that is electrically connected to an AC power line on a downstream side of a power supply line breaker of a power supply unit of an electromagnetic pump, improves a power factor during normal operation, and supplies power to the electromagnetic pump at a time of loss of AC power supply to the electromagnetic pump, the electromagnetic pump compensation power supply apparatus comprising: a rotor shaft that rotates around an axis; a flywheel that stores rotation energy and is fixed to the rotor shaft; an exciter rotor winding that is fixed to the rotor shaft; a rotating rectifier that is fixed to the rotor shaft, and converts alternate current generated on the exciter rotor winding into direct current; a winding type synchronous machine rotor winding that is fixed to the rotor shaft, and receives direct current supplied from the rotating rectifier; a winding type synchronous machine stator winding that is fixed in a stationary manner so as to face the winding type synchronous machine rotor winding, constitutes a winding type synchronous machine along with the winding type synchronous machine rotor winding, and converts rotational energy into electrical energy and electrical energy into rotational energy; an exciter stator permanent magnet apparatus that includes an exciter stator permanent magnet, which constitutes an exciter along with the exciter rotor winding, and can switch between two states, which are non-excited state and excited state; and a synchronous machine side power supply line that connects the winding type synchronous machine stator winding and the AC power line on a downstream side of the power supply line breaker.

According to another embodiment, there is provided an electromagnetic pump system comprising: an electromagnetic pump; a power supply unit of the electromagnetic pump, the power supply unit including: an inverter apparatus which converts power from an AC system bus into AC power having predetermined frequency and voltage to supply to the electromagnetic pump, and a power supply line breaker which is connected to an output side of the inverter apparatus and cuts off AC power; and an electromagnetic pump compensation power supply apparatus that is electrically connected to the electromagnetic pump on an electromagnetic pump's side of the power supply line breaker, and improves a power factor during normal operation, and supplies power to the electromagnetic pump at a time of loss of AC power supply to the electromagnetic pump; wherein the electromagnetic pump compensation power supply apparatus includes: a rotor shaft that rotates around an axis, a flywheel that stores rotation energy and is fixed to the rotor shaft, an exciter rotor winding that is fixed to the rotor shaft, a rotating rectifier that is fixed to the rotor shaft, and converts alternate current, generated on the exciter rotor winding into direct current, a winding type synchronous machine rotor winding that is fixed to the rotor shaft, and receives direct current supplied from the rotating rectifier, a winding type synchronous machine stator winding that is fixed in a stationary manner so as to face the winding type synchronous machine rotor winding, constitutes a winding type synchronous machine along with the winding type synchronous machine rotor winding, and converts rotational energy into electrical energy and electrical energy into rotational energy, an exciter stator permanent magnet apparatus that includes an exciter stator permanent magnet, which constitutes an exciter along with the exciter rotor winding, and can switch between two states, which are non-excited state and excited state, and a synchronous machine side power supply line that connects the winding type synchronous machine stator winding and an AC power line on a downstream side of the power supply line breaker.

Advantage of the Invention

According to the present invention, it is possible to provide a highly-reliable electromagnetic pump compensation power supply apparatus and an electromagnetic pump system that include a function of carrying out reactive power compensation to improve a low power factor of an electromagnetic pump during normal operation of a plant, and a function of offering a required electric power output characteristic without being controlled from outside.

EMBODIMENTS FOR CARRYING OUT THE INVENTION

Hereinafter, with reference to the accompanying drawings, embodiments of electromagnetic pump compensation power supply apparatus and electromagnetic pump system of the present invention will be described. The same or similar portions are represented by the same reference symbols, and a duplicate description will be omitted.

First Embodiment

Figure 1:
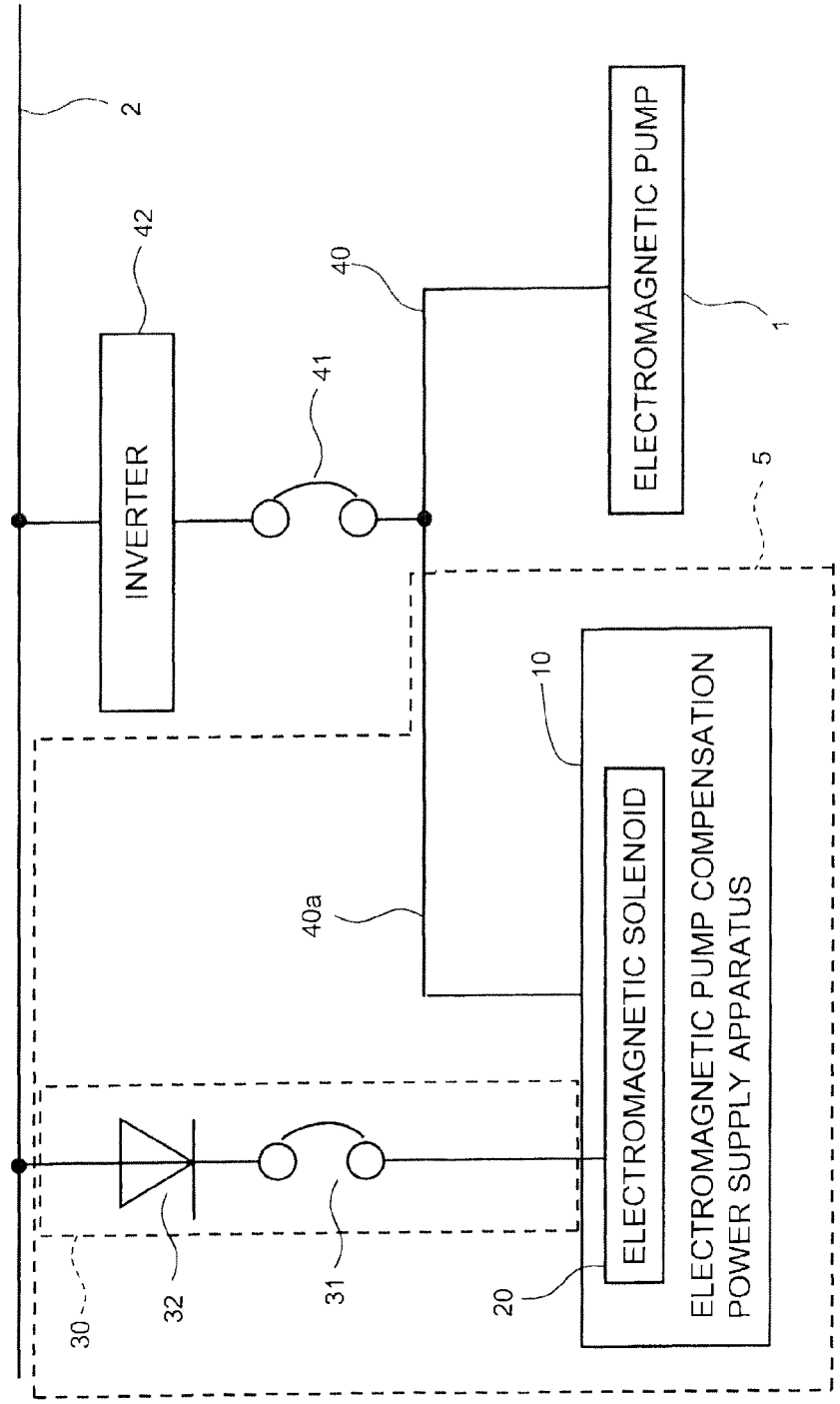
FIG. 1 is a schematic diagram showing the electrical configuration of a first embodiment an electromagnetic pump compensation power supply apparatus according to the present invention.

FIG. 1 is a schematic diagram showing the electrical configuration of a first embodiment of an electromagnetic pump compensation power supply apparatus according to the present invention.

As shown in FIG. 1, an electromagnetic pump compensation power supply apparatus 5 of the present embodiment includes an electromagnetic pump compensation power supply mechanism 10, a DC power supply unit 30, and a synchronous machine side power supply line 40a.

To an electromagnetic pump 1, power is fed from an AC system bus 2 via an inverter apparatus 42 and a power supply line breaker 41 which is connected in series to a downstream side of the inverter apparatus 42, and through an AC power line 40.

To change a flow rate and a pump head characteristics of the electromagnetic pump 1, the inverter apparatus 42 has a function of changing frequency and voltage of drive power for the electromagnetic pump 1 through a process of converting power of the AC system bus 2 from alternate current to direct current and a subsequent process of converting from direct current to alternate current.

On a downstream side of the power supply line breaker 41 of the power supply line, the electromagnetic pump compensation power supply mechanism 10 is electrically connected to the electromagnetic pump 1 via the synchronous machine side power supply line 40a. More specifically, the synchronous machine side power supply line 40a is connected to a winding type synchronous machine stator winding 13a (described later), which is component part of the electromagnetic pump compensation power supply mechanism 10.

An electromagnetic solenoid 20 in the electromagnetic pump compensation power supply mechanism 10 is connected to the AC system bus 2 via the DC power supply unit 30 independently of the above power supply line.

The DC power supply unit 30 includes a DC supply line breaker 31 and a DC supply line rectifier 32, which are connected in series to each other.

Figure 2:
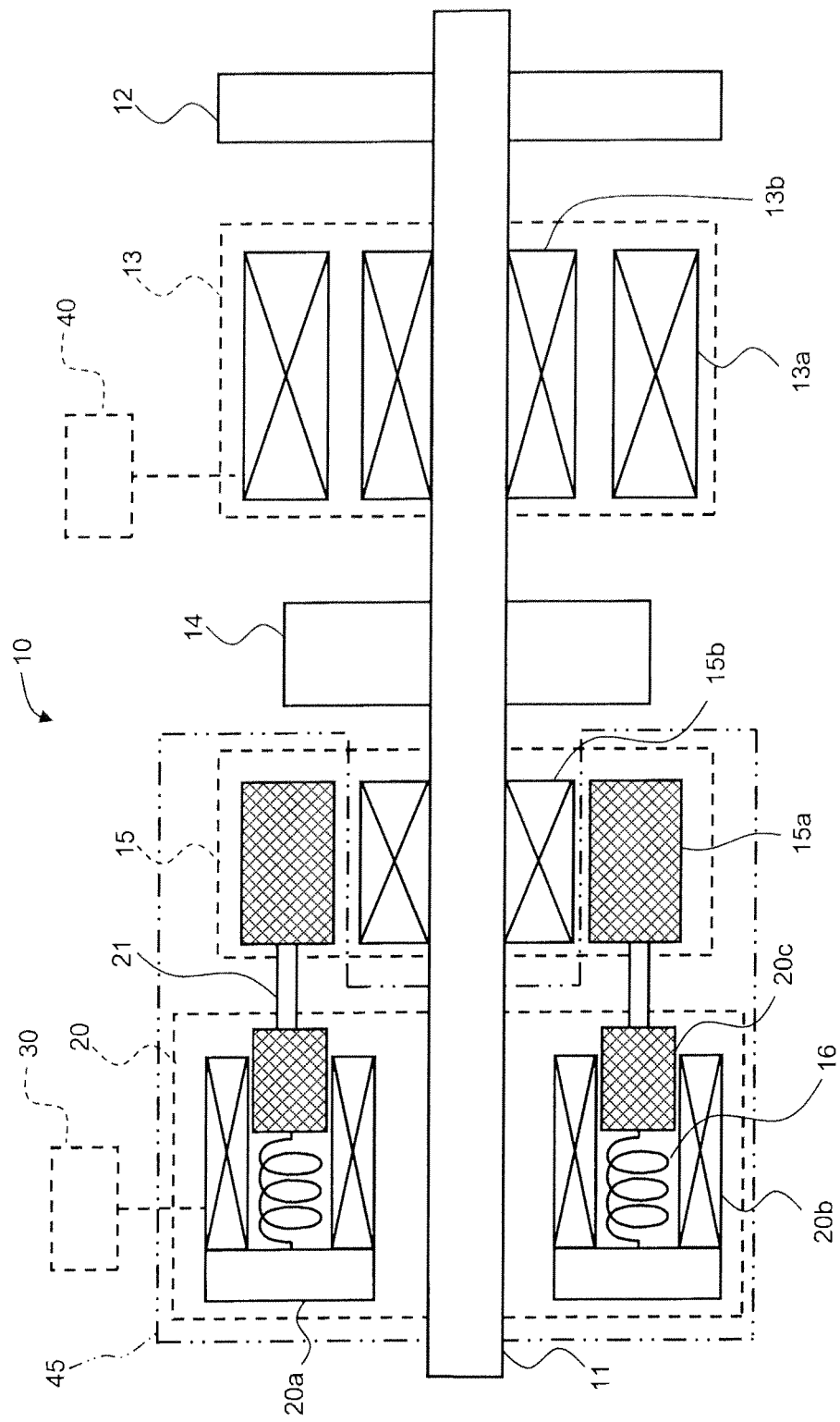
FIG. 2 is a schematic longitudinal cross-sectional view showing the mechanical configuration of the electromagnetic pump compensation power supply apparatus of FIG. 1.

FIG. 2 is a schematic longitudinal cross-sectional view showing the mechanical configuration of the electromagnetic pump compensation power supply mechanism 10 of FIG. 1.

By broad classification, the electromagnetic pump compensation power supply mechanism 10 includes a flywheel 12, a winding type synchronous machine 13, a rotating rectifier 14, and an exciter 15. The winding type synchronous machine 13 includes a winding type synchronous machine stator winding 13a and a winding type synchronous machine rotor winding 13b. The exciter 15 includes an exciter stator permanent magnet apparatus 45 and an exciter rotor winding 15b. The exciter stator permanent magnet apparatus 45 has a drive mechanism including an exciter stator permanent magnet 15a, electromagnetic solenoids 20, and connecting rods 21.

The exciter stator permanent magnet apparatus 45 is so formed as to switch between an excited state in which an excitation function is exerted with the exciter stator permanent magnet 15a and the exciter rotor winding 15b facing each other, and a non-excited state in which the excitation function is not exerted as the exciter stator permanent magnet 15a and the exciter rotor winding 15b are so positioned as not to face each other.

The flywheel 12, the winding type synchronous machine rotor winding 13b of the winding type synchronous machine 13, the rotating rectifier 14, and the exciter rotor winding 15b of the exciter 15 are directly-connected to each other on the same rotor shaft 11.

The flywheel 12 is an apparatus for storing energy as rotation energy during normal operation. The size and the weight of the flywheel 12 are so configured that rotation energy can be secured to supply required power to the electromagnetic pump 1 to obtain the flow coast down characteristic at a time when a plant trip or loss of offsite power has occurred.

Although not shown in the diagrams, the exciter rotor winding 15b is electrically connected to an input side of the rotating rectifier 14. An output side of the rotating rectifier 14 is electrically connected to the winding type synchronous machine rotor winding 13b.

An alternate current generated on the exciter rotor winding 15b of the exciter 15 is converted into direct current in the rotating rectifier 14 during normal operation, and the direct current flows through the winding type synchronous machine rotor winding 13b having an excitation function. Accordingly, the winding type synchronous machine 13 induces voltage on the winding type synchronous machine stator winding 13a, supplying power to the electromagnetic pump 1.

As described below an exciter stator permanent magnet 15a of the exciter 15 is so formed as to move in a rotation-axis direction with the help of action of electromagnetic solenoids 20.

The electromagnetic solenoids 20 each includes an electromagnetic solenoid support plate 20a, an electromagnetic solenoid coil 20b, and an electromagnetic solenoid permanent magnet 20c.

The electromagnetic solenoid permanent magnet 20c is connected to a spring 16 that is fixed to the solenoid support plate 20a. A portion of the electromagnetic solenoid permanent magnet 20c may not be permanent magnet as long as the portion is driven by magnetic force of an electromagnet.

The connecting rods 21, which extend in the rotation-axis direction, are used to connect the exciter stator permanent magnets 15a and the electromagnetic solenoid permanent magnets 20c. The electromagnetic solenoids 20 and the connecting rods 21 are major components of a mechanism ("drive mechanism") that has a function of driving the exciter stator permanent magnets 15a.

During normal operation of a plant, magnetic energy that is supplied from the electromagnetic solenoid coils 20b is accumulated the springs 16 as elastic energy because of interaction between the electromagnetic solenoid coils 20b and the electromagnetic solenoid permanent magnets 20c. In this state, the springs 16 may be in any of a compressed state or a pulled state.

In this state, the exciter stator permanent magnets 15a are moved in an axial direction from a position where the exciter stator permanent magnets 15a face the exciter rotor windings 15b in a radial direction, and are kept at a position (referred to as "non-facing position," hereinafter) that is away therefrom.

At a time when a plant trip or loss of offsite power has occurred, no power is supplied by external power source from the DC power supply unit 30 to the electromagnetic solenoid coils 20b. Therefore, with the help of the elastic energy of the springs 16, the exciter stator permanent magnets 15a promptly move in the rotation-axis direction in conjunction with the electromagnetic solenoid permanent magnets 20c; the exciter stator permanent magnets 15a return a home position, or a position referred to as "facing position," hereinafter) where the exciter stator permanent magnets 15a face the exciter rotor winding 15b in the radial direction.

The number of turns of the exciter rotor windings 15b, and the non-facing position of the exciter stator permanent magnets 15a are set in such a way as to enable the winding type synchronous machine 13 to generate reactive power that is required for the electromagnetic pump 1 during normal operation of a plant.

The following describes an operation of the electromagnetic pump compensation power supply mechanism 10.

During normal operation, a direct current is supplied to the electromagnetic solenoid coils 20b via the DC supply line rectifier 32 from the AC system bus 2; the electromagnetic solenoids 20, which are part of the electromagnetic pump compensation power supply mechanism 10, is in operation.

That is, by magnetic attractive force of the electromagnetic solenoid coils 20b and the electromagnetic solenoid permanent magnets 20c, the electromagnetic solenoid permanent magnets 20c and, the exciter stator permanent magnets 15a which are connected to the electromagnetic solenoid permanent magnets 20c via the connecting rods 21, are drawn toward the electromagnetic solenoid support plate 20a. At this time, elastic energy is accumulated in the springs 16, and the exciter stator permanent magnets 15a are moved away from the position where the exciter stator permanent magnets 15a face the exciter rotor windings 15b.

As a result, a magnetic flux interlinked with the exciter windings 15b decreases, and an excitation current flowing through the winding type synchronous machine rotor windings 13b decreases. Therefore, the winding type synchronous machine 13 ends up being in a leading power factor operation.

When the winding type synchronous machine 13 is in a steady state during normal operation, the winding type synchronous machine 13 is in a synchronous phase modifier operation because the machine is in a no-load state except for windage loss. In the leading power factor operation, advanced reactive power can be generated and supplied to the electromagnetic pump 1.

The number of turns of the electromagnetic solenoid coils 20b is adjusted in such a way as to generate reactive power that is required for the electromagnetic pump 1 during rated operation. Therefore, during normal operation of a plant, no control apparatus is required for the electromagnetic solenoids 20.

When a plant trip or loss of offsite power have occurred, the power supply line breaker 41 cuts off the electromagnetic pump compensation power supply mechanism 10 and the electromagnetic pump 1 from the inverter apparatus 42 in order to ensure safety functions of the electromagnetic pump compensation power supply mechanism 10 and the electromagnetic pump 1. At the same time, the DC supply line breaker 31 cuts the electromagnetic solenoids 20 off from the AC system bus 2.

At this time, no power is supplied to the winding type synchronous machine 13. However, the flywheel 12 and the rotor shaft 11 in which rotation energy has been stored continue to rotate for a while because of inertia, without being powered by external power source.

Since no power is supplied to the electromagnetic solenoids 20, the magnetic attractive force between the electromagnetic solenoid coils 20b and the electromagnetic solenoid permanent magnets 20c disappears. Therefore, the spring elastic force of the springs 16 helps the exciter stator permanent magnets 15a move promptly back to the original facing position where the exciter stator permanent magnets 15a face the exciter rotor windings 15b.

As a result, the magnetic flux interlinked with the exciter rotor windings 15b increases, and the excitation current of the winding type synchronous machine rotor windings 13b increases. Therefore, the winding type synchronous machine 13 automatically switches to a lagging power factor operation. As a result, the winding type synchronous machine 13 becomes able to supply, without external power source, required power to the electromagnetic pump 1 to obtain the flow coast down characteristic.

As described above, the exciter stator permanent magnet apparatus 45, which has the drive mechanism including the exciter stator permanent magnets 15a, the electromagnetic solenoids 20 and the connecting rods 21, has a function of switching between excited state and non-excited state in the exciter 15, as a whole.

According to the present embodiment, during normal operation, because of the electromagnetic solenoids 20, the exciter stator permanent magnets 15a move from the home position, resulting in a decrease in field current of the winding type synchronous machine 13. As a result, the winding type synchronous machine 13 of the electromagnetic ump compensation power supply mechanism 10 that is in an almost no-load state enters a leading power factor operation; reactive power can be supplied to the low power-factor electromagnetic pump 1.

Therefore, the power factor of the electromagnetic pump 1 during normal operation is improved, and an ancillary-provided power equipment can be made significantly smaller in size.

When a power supply circuit is cut off from the electromagnetic pump 1 as abnormality occurs, the spring elastic force of the springs 16 helps the exciter stator permanent magnets 15a of the exciter 15 move automatically back to the facing position, and the winding type synchronous machine 13 switches to the lagging power factor operation.

That is, power is supplied to the electromagnetic pump 1 from the exciter 15 and the winding type synchronous machine 13 via the synchronous machine side power supply line 40a because of the rotation energy accumulated in the flywheel 12. Therefore, the power required to ensure a required flow coast down characteristic is obtained without external power source. Thus, a control circuit that adjusts an electrical output of the electromagnetic pump compensation power supply mechanism 10 is not required. Therefore, it is possible to improve reliability.

As described above, according to the present embodiment, it is possible to provide a highly-reliable electromagnetic pump compensation power supply apparatus that includes the function of carrying out reactive power compensation to improve a low power factor of the electromagnetic pump during normal operation of plant, and the function of offering a required electric power output characteristic without being controlled from outside.

Second Embodiment

Figure 3:
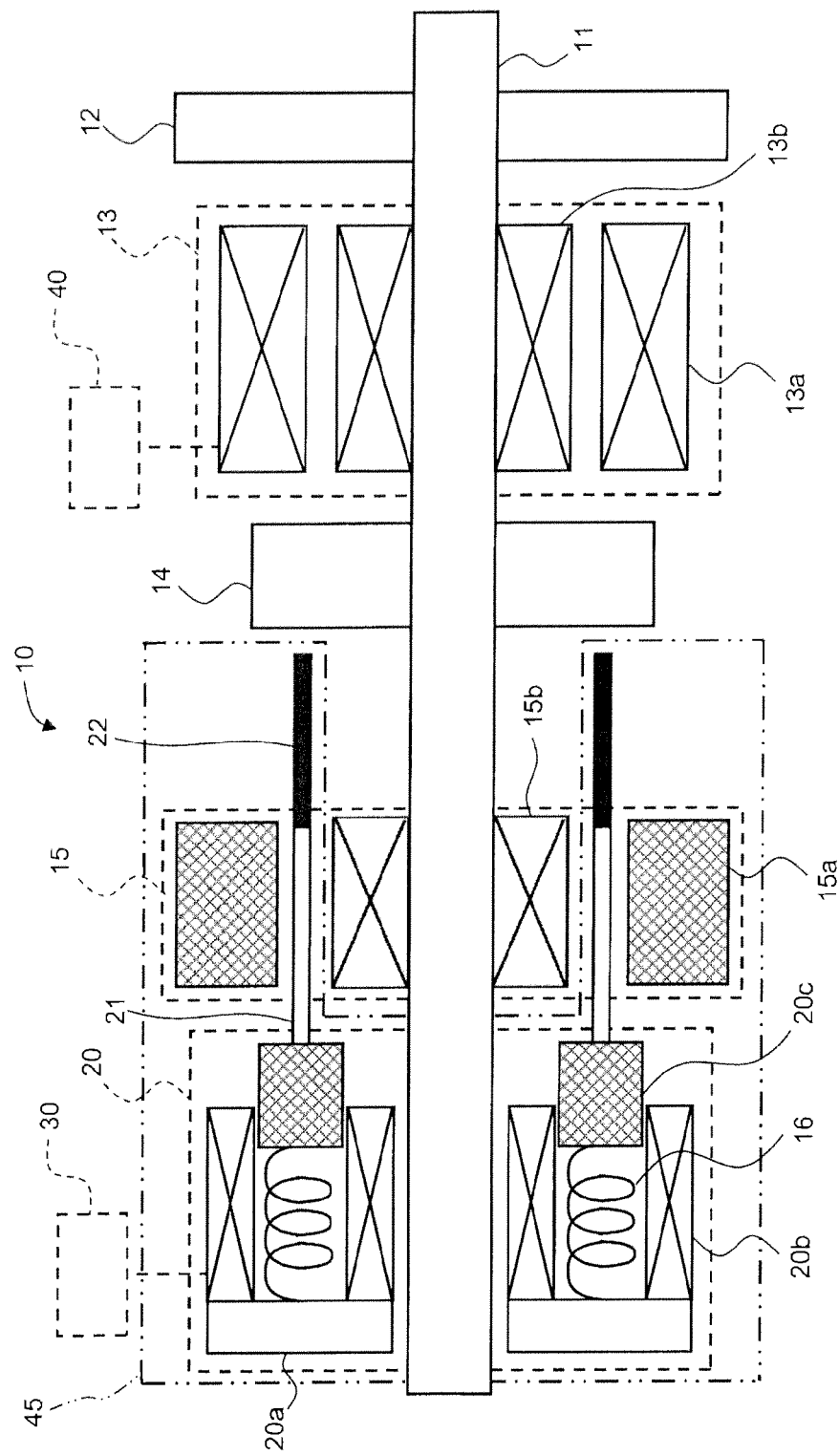
FIG. 3 is a schematic vertical cross-sectional view showing the mechanical configuration of a second embodiment of an electromagnetic pump compensation power supply apparatus according to the present invention.

FIG. 3 is a schematic vertical cross-sectional view showing the mechanical configuration of a second embodiment of an electromagnetic pump compensation power supply apparatus according to the present invention.

As shown in FIG. 3, in an electromagnetic pump compensation power supply mechanism 10 of an electromagnetic pump compensation power supply apparatus 5 of the present embodiment, an exciter stator permanent magnet apparatus 45 has a drive mechanism including exciter stator permanent magnets 15a, a magnetic shield plate 22, electromagnetic solenoids 20, and connecting rods 21.

A cylindrical magnetic shield plate 22 is provided midway between an exciter stator permanent magnet 15a and an exciter rotor winding 15b in the radial direction; the magnetic shield plate 22 is moved by the electromagnetic solenoids 20 in the axial direction by connecting rods 21.

The exciter stator permanent magnets 15a and the exciter rotor windings 15b are so positioned as to face each other. However, the exciter stator permanent magnet apparatus 45 includes the magnetic shield plate 22. The magnetic shield plate 22 is so formed as to be able to switch between an excited state in which an excitation function is exerted as no magnetic shield plate 22 between the exciter stator permanent magnets 15a and the exciter rotor windings 15b, and a non-excited state in which the excitation function is not exerted as the magnetic shield plate 22 is between the exciter stator permanent magnets 15a and the exciter rotor windings 15b.

The magnetic shield plate 22 is made from magnetic material such as an electromagnetic steel plate.

During normal operation, the electromagnetic solenoids 20 is running; the magnetic shield plate 22 is at an intervening position between the exciter stator permanent magnets 15a and the exciter rotor windings 15b.

At this time, part of a magnetic flux caused by a permanent magnet flows to the magnetic shield plate 22. As a result, the magnetic flux interlinked with the exciter rotor windings 15b decreases, and the excitation current flowing through the winding type synchronous machine rotor windings 13b decreases. Therefore, the winding type synchronous machine 13 ends up being in a leading power factor operation.

When a plant trip or loss of offsite power has occurred, the supply of power to the electromagnetic solenoids 20 is shut down, and then the spring elastic force of the springs 16 helps the magnetic shield plate 22 move in the axial direction. The magnetic shield plate 22 promptly moves to a position (referred to as "non-intervening position," hereinafter) that is away from the intervening position between the exciter stator permanent magnets 15a of the exciter 15 and the exciter rotor windings 15b.

As a result, the magnetic flux interlinked with the exciter rotor windings 15b increases, and the excitation current of the winding type synchronous machine rotor windings 13b increases. Therefore, the winding type synchronous machine 13 automatically switches to a lagging power factor operation.

As described above, the exciter stator permanent magnet apparatus 45, which has the drive mechanism including the exciter stator permanent magnets 15a, the electromagnetic solenoids 20, and the connecting rods 21, and the magnetic shield plate 22, has a function of switching between excited state and non-excited state in the exciter 15, as a whole.

According to the present embodiment, the length of gaps between the exciter stator permanent magnets 15a of the exciter 15 and the exciter rotor windings 15b become longer. However, the weight of a moving object is decreased, and the electromagnetic solenoids 20 therefore can be made smaller in size. Moreover, the reliability is improved as the exciter stator permanent magnets 15a of the exciter 15 do not move.

As described above, according to the present embodiment, it is possible to provide a highly-reliable electromagnetic pump compensation power supply apparatus that includes the function of carrying out reactive power compensation to improve a low power factor of the electromagnetic pump during normal operation of a plant, and the function of offering a required electric power output characteristic without being controlled from outside.

Third Embodiment

Figure 4:
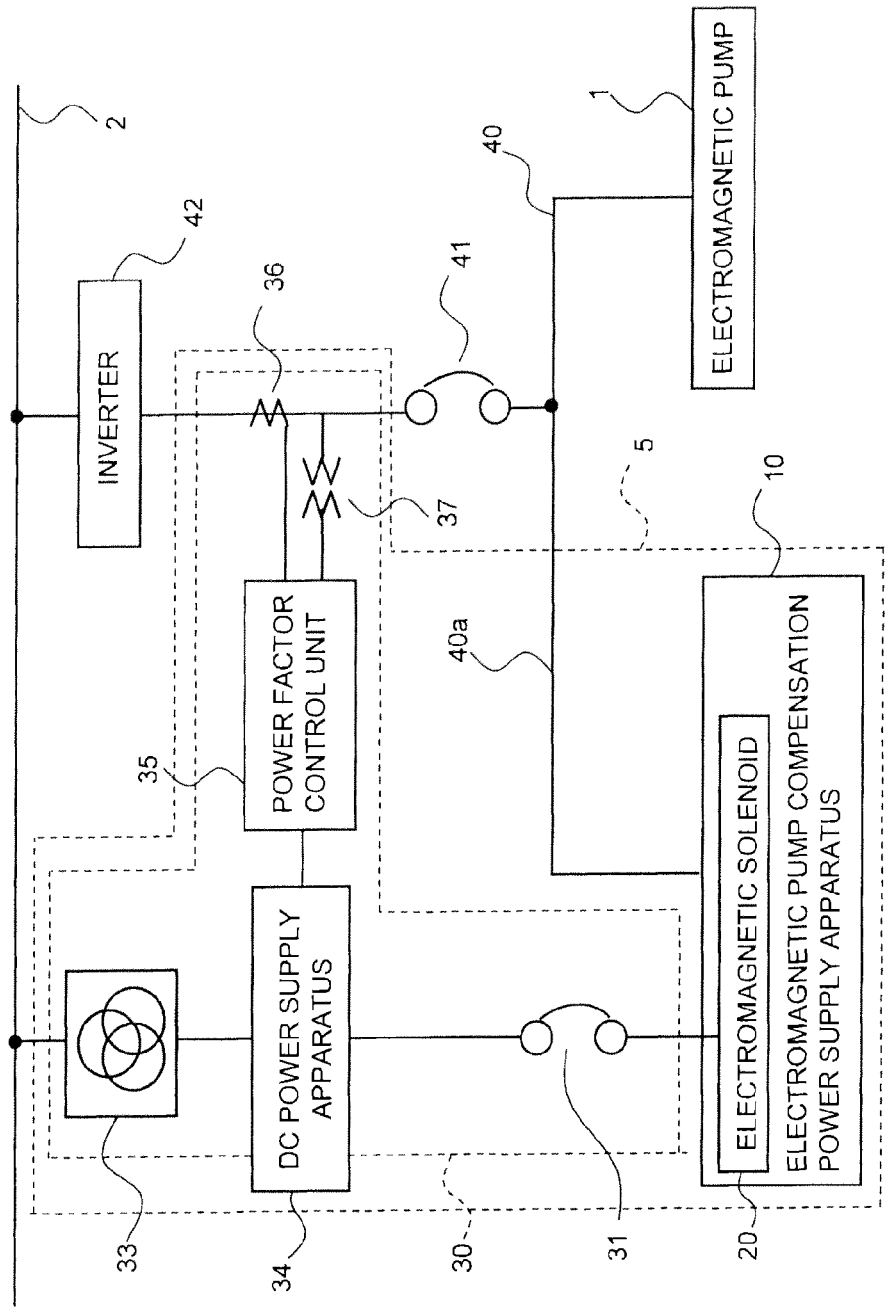
FIG. 4 is a schematic diagram showing the electrical configuration of a third embodiment of an electromagnetic pump compensation power supply apparatus according to the present invention.

FIG. 4 is a schematic diagram showing the electrical configuration of a third embodiment of an electromagnetic pump compensation power supply apparatus according to the present invention.

According to the present embodiment, as shown in FIG. 4, step-down transformer 33, a DC power supply apparatus 34 and a DC supply line breaker 31 are placed in a DC power supply unit 30 between an AC system bus 2 and electromagnetic solenoids 20, and are connected in series in that order.

Furthermore, a power factor control unit 35 is provided to control the DC power supply apparatus 34 in such a way as to improve a power factor on the basis of current and voltage signals from a current transformer 36 and a potential transformer 37, which are provided on a power supply line of the electromagnetic pump 1.

The power factor control unit 35 is designed to continuously control voltage supplied to the electromagnetic solenoids 20 during normal operation.

The configuration of the other components is the same as the first or second embodiment.

According to the present embodiment, the DC power supply apparatus 34, the power factor control unit 35, the current former 36, and the potential transformer 37 need to be added. However, during normal operation of a plant, it is possible for the electromagnetic solenoids 20 to continuously control the positions of the exciter stator permanent magnets 15a. Therefore, even in any operation state other than the rated operation, the power factor can be improved.

As described above, according to the present embodiment, the same advantageous effects as those of the first or second embodiment can be achieved. Moreover, it is possible to offer a more delicate reactive power compensation function for improving a low power factor of the electromagnetic pump during normal operation of a plant, as well as a required electric power output characteristic without being controlled from outside.

Fourth Embodiment

Figure 5:
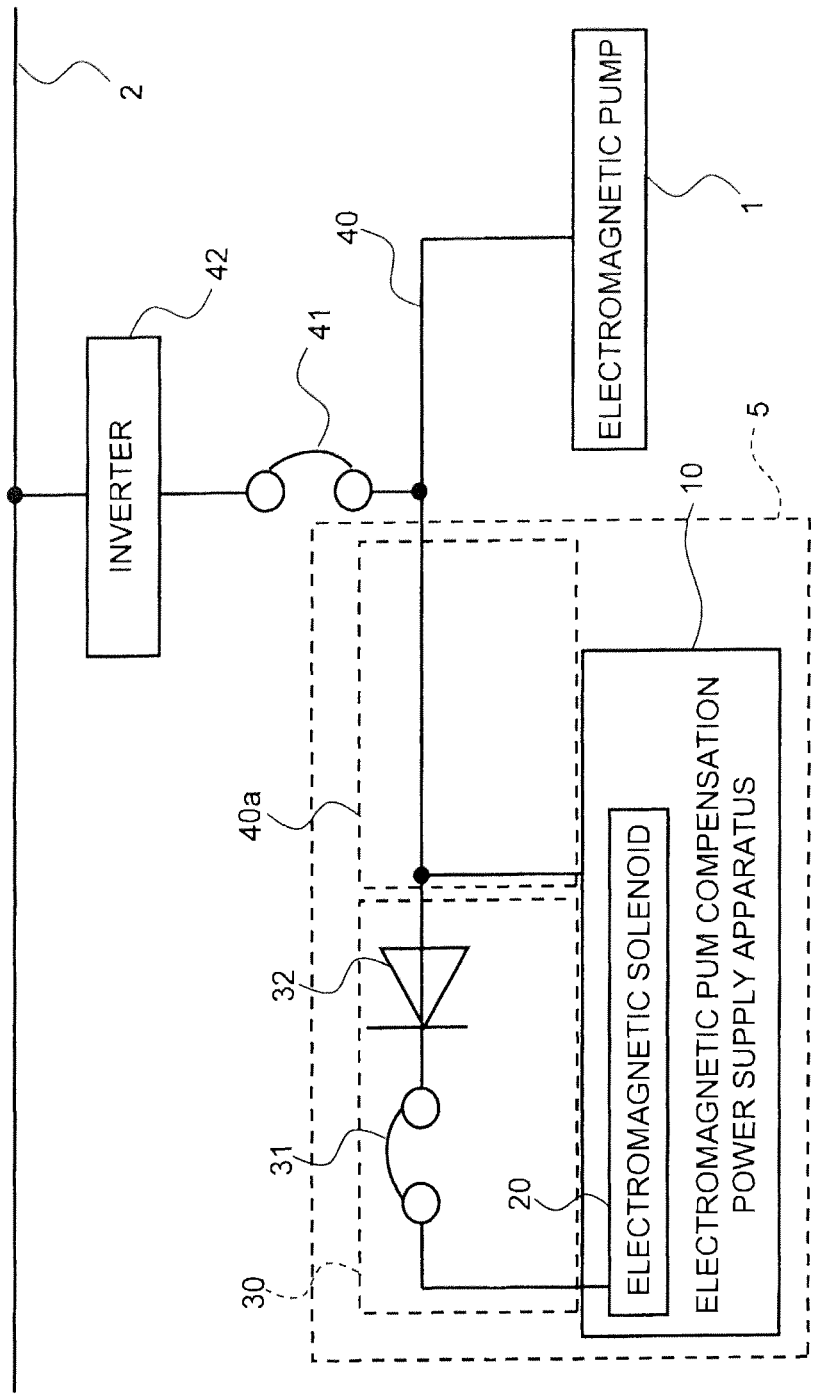
FIG. 5 is a schematic diagram showing the electrical configuration of a fourth embodiment of an electromagnetic pump compensation power supply apparatus according to the present invention.

FIG. 5 is a schematic diagram showing the electrical configuration of a fourth embodiment of an electromagnetic pump compensation power supply apparatus according to the present invention.

As shown in FIG. 5, the power that is supplied to the electromagnetic solenoids 20 during normal operation is not supplied through a direct line from the AC system bus 2, but supplied by branching from the synchronous machine side power supply line 40a, which is a power supply line for the winding type synchronous machine dings 13a of the winding type synchronous machine 13, to the DC power supply unit 30.

The DC power supply unit 30 includes the DC supply line rectifier 32 and the DC supply line breaker 31 as in the case of the first embodiment.

According to the present embodiment, since the electromagnetic solenoids 20 is operated, the capacity of the winding type synchronous machine 13 needs to become larger accordingly. However, compared with each of the above embodiments, the number of lines between the electromagnetic pump compensation power supply mechanism 10 and the AC system bus 2 is decreased, making it easier to design the layout of the power equipment.

As described above, according to the present embodiment, it is possible to provide a highly-reliable electromagnetic pump compensation power supply apparatus that includes a function of carrying out reactive power compensation to improve a low power factor of an electromagnetic pump during normal operation of a plant, and a function of offering a required electric power output characteristic without being controlled from outside. Furthermore, the quantity is reduced, and it becomes easier to design the layout of the power equipment.

Fifth Embodiment

Figure 6:
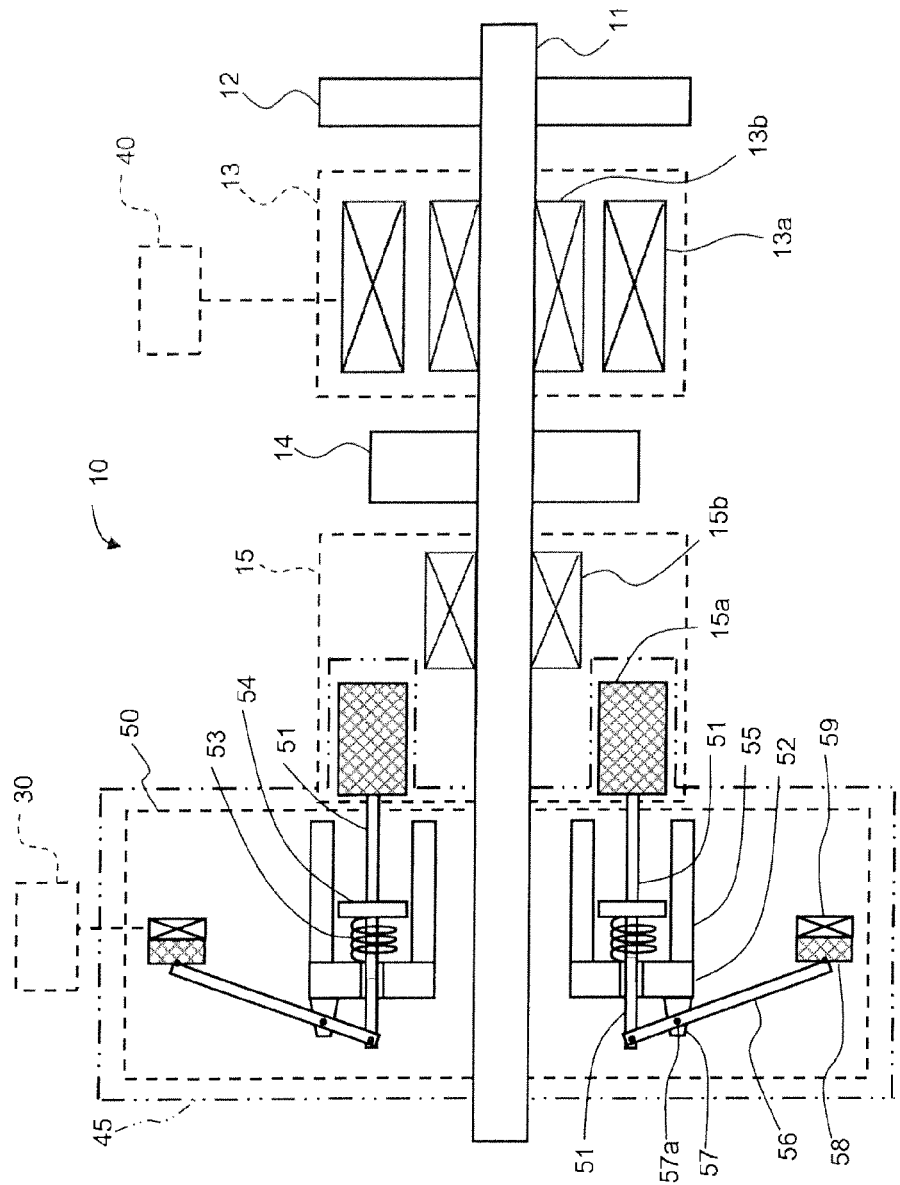
FIG. 6 is a schematic longitudinal cross-sectional view showing the mechanical configuration of a fifth embodiment of an electromagnetic pump compensation power supply apparatus according to the present invention.

FIG. 6 is a schematic longitudinal cross-sectional view showing the mechanical configuration of a fifth embodiment of an electromagnetic pump compensation power supply apparatus according to the present invention.

The present embodiment is a variant of the first embodiment. The present embodiment is the same as the first embodiment in that the exciter stator permanent magnets 15a of the exciter 15 are so formed as to be able to move in the rotation-axis direction due to the action of the electromagnetic solenoid. According to the first embodiment, the electromagnetic solenoids 20, the exciter stator permanent magnets 15a, and the electromagnetic solenoid permanent magnets 20c are directly connected. According to the present embodiment, elements are added to ensure functionality even if the electromagnetic force of the electromagnetic solenoid is weak.

A drive mechanism 50 includes connecting rods 51, a support plate 52, compression springs 53, and compression spring stop plates 54, guide sections 55, lever rods 56, fulcrum stages 57, lever permanent magnets 58 and lever electromagnetic solenoids 59.

A support plate 52 is fixed to an external portion (or a casing, which is not shown in the diagram, for example). The support plate 52 supports one end of a compression spring 53. Connecting rods 51 are connected to an exciter stator permanent magnet 15a. In the middle of the connecting rods 51, compression spring stop plates 54 are provided.

The other end of the compression spring 53 is supported by the compression spring stop plate 54; the compression spring 53 is held between the support plate 52 and the compression spring stop plate 54. The other side of the connecting rod 51 from the connecting portion with the exciter stator permanent magnet 15a passes through the support plate 52; an end portion thereof is connected to a lever rod 56.

The other end of the lever rod 56 from the connecting portion with the connecting rod 51 is connected to a lever permanent magnet 58. A middle portion of the lever rod 56 is connected to a lever rod fulcrum 57a on a fulcrum stage 57 so as to be able to rotate. The connecting-portion length of the lever rod 56 between the lever rod fulcrum 57a and the lever permanent magnet 58 is sufficiently longer than the length between the connecting portion with the connecting rod 51 and the lever rod fulcrum 57a.

According to the present embodiment, a lever electromagnetic solenoid 59, the lever rods 56, and connecting sections such as the connecting rods 51 are major components of the drive mechanism that has a function of driving the exciter stator permanent magnets 15a.

The lever electromagnetic solenoid 59 is fixed to an external portion; DC power is supplied thereto from the DC power supply unit 30.

The length of a lever rod 56 and others are so set that a positional relationship between an exciter stator permanent magnet 15a and an exciter rotor winding 15b varies according to whether the compression spring is in a compressed state or in a released state.

That is, the length of a lever rod 56 and others are so set that a lever permanent magnet 58 is attracted to the lever electromagnetic solenoid 59, and the exciter stator permanent magnet 15a is at a non-facing position with respect to the exciter rotor winding 15b because of a magnetic attractive force thereof in a situation where DC power is supplied to the lever electromagnetic solenoid 59.

And, the lever permanent magnet 58 moves away from the lever electromagnetic solenoid 59 as the compression spring 53 is released from a compression state, and the exciter stator permanent magnet 15a is at a facing position with respect to the exciter rotor winding 15b in a situation where DC power is not supplied to the lever electromagnetic solenoid 59.

According to the present embodiment with the above configuration, DC power is supplied from the DC power supply unit 30 to the lever electromagnetic solenoid 59 during normal operation. Therefore, the lever permanent magnet 58 is attracted to the lever electromagnetic solenoid 59, and the exciter stator permanent magnet. 15a moves to a non-facing position with respect to the exciter rotor winding 15b through the lever rod 56 and the connecting rod 51.

When a plant trip or loss of offsite power has occurred, the supply of power to the lever electromagnetic solenoid 59 is cut off. Accordingly, the magnetic attractive force between the lever electromagnetic solenoid 59 and the lever permanent magnet 58 disappears. Therefore, the spring elastic force of the compression spring 53 helps the exciter stator permanent magnet 15a move promptly back to, the original facing position where the exciter stator permanent magnet 15a faces the exciter rotor winding 15b.

As described above, the exciter stator permanent magnet apparatus 15a, and the drive mechanism 50 including the electromagnetic solenoids 59, the connecting rods 51, and the lever rods 56 have a function of switching between excited state and non-excited state in the exciter 15, as a whole.

According to the present embodiment, even when the magnetic attractive force between the lever permanent magnet 58 and the lever electromagnetic solenoid 59 is smaller compared with the spring elastic force of the compression spring 53, the principle of leverage works in such a way that the position of the exciter stator permanent magnet 15a can be maintained by a small magnetic attractive force. Therefore, during normal operation, it is possible to prevent disturbance caused by malfunction, and the occurrence of trouble.

As described above, according to the present embodiment, the same advantageous effects as those of the first embodiment can be obtained. Moreover, the position of the exciter stator permanent magnet 15a can be maintained by small magnetic attractive force. Therefore, during normal operation, it is possible to prevent disturbance caused by malfunction, and the occurrence of trouble.

Other Embodiments

The above has described several embodiments of the present invention. However, the embodiments have been presented by way of example, and are not intended to limit the scope of the invention.

For example, the present invention can be applied not only to fast reactor plants, but also to facilities and plants that use electromagnetic pumps and have the similar problems.

Features of various embodiments may be used in combination. For example, the configuration of the electromagnetic pump compensation power supply mechanism 10 of the third, fourth, and fifth embodiments may be the same as those shown in FIG. 2 or 3.

The embodiments may be embodied in other various forms. Various omissions, replacements and changes may be made without departing from the subject-matter of the invention.

The above embodiments and variants thereof are within the scope and subject-matter of the invention, and are similarly within the scope of the invention defined in the appended claims and the range of equivalency thereof.

EXPLANATION OF REFERENCE SYMBOLS

1: electromagnetic pump
2: AC system bus
5: electromagnetic pump compensation power supply apparatus
10: electromagnetic pump compensation power supply mechanism
11: rotor shaft
12: flywheel
13: winding type synchronous machine
13a: winding type synchronous machine stator winding
13b: winding type synchronous machine rotor winding
14: rotating rectifier
15: exciter 15a: exciter stator permanent magnet
15b: exciter rotor winding
16: spring (elastic body)
20: electromagnetic solenoid (driving mechanism)
20a: electromagnetic solenoid support plate
20b: electromagnetic solenoid coil
20c: electromagnetic solenoid permanent magnet
21: connecting rod
22: magnetic shield plate
30: DC power supply unit
31: supply line breaker
32: DC supply line rectifier
33: step-down transformer
34: DC power supply apparatus
35: power factor control unit
36: current transformer
37: potential transformer
40: AC power line
40a: synchronous machine side power supply line
41: power supply line breaker
42: inverter apparatus
45: exciter stator permanent magnet apparatus
50: drive mechanism
51: connecting rod
52: support plate
53: compression springs (elastic body)
54: compression spring stop plate
55: guide section
56: lever rod
57: fulcrum stage
57a: lever rod fulcrum
58: lever permanent magnet
59: lever electromagnetic solenoid

The invention claimed is:

1. An electromagnetic pump compensation power supply apparatus that is electrically connected to an AC power line on a downstream side of a power supply line breaker of a power supply unit of an electromagnetic pump, improves a power factor during normal operation, and supplies power to the electromagnetic pump at a time of loss of AC power supply to the electromagnetic pump, the electromagnetic pump compensation power supply apparatus comprising:
    a rotor shaft that rotates around an axis;
    a flywheel that stores rotation energy and is fixed to the rotor shaft;
    an exciter rotor winding that is fixed to the rotor shaft;
    a rotating rectifier that is fixed to the rotor shaft, and converts alternate current generated on the exciter rotor winding into direct current;
    a winding type synchronous machine rotor winding that is fixed to the rotor shaft, and receives direct current supplied from the rotating rectifier;
    a winding type synchronous machine stator winding that is fixed in a stationary manner so as to face the winding type synchronous machine rotor winding, constitutes a winding type synchronous machine along with the winding type synchronous machine rotor winding, and converts rotational energy into electrical energy and electrical energy into rotational energy;
    an exciter stator permanent magnet apparatus that includes
        an exciter stator permanent magnet, which constitutes an exciter along with the exciter rotor winding, and can switch between two states, which are non-excited state and excited state, and
        an elastic body configured to impart a restoring force to move the exciter stator permanent magnet in a predetermined direction; and
    a synchronous machine side power supply line that connects the winding type synchronous machine stator winding and the AC power line on a downstream side of the power supply line breaker; and
    a DC power supply unit that uses, as power source, the same AC power line that is a power source for the electromagnetic pump power supply unit, and is configured to convert alternate current into direct current and configured to supply direct current to a drive mechanism and cut off a supply of the direct current, wherein
    the drive mechanism is configured to generate an opposing force against the restoring force of the elastic body and to lose the opposing force as the supply of the direct current is cut off.

2. The electromagnetic pump compensation power supply apparatus according to claim 1, wherein
    the elastic body is fixed in a stationary manner, and forces the exciter stator permanent magnet, which is a to-be-driven object, toward a facing position; and
    the drive mechanism is fixed in a stationary manner, and generates the opposing force against the restoring force of the elastic body in such a way as to move the exciter stator permanent magnet to a non-facing position.

3. The electromagnetic pump compensation power supply apparatus according claim 2, wherein
    the drive mechanism includes:
        an electromagnetic solenoid having an electromagnetic solenoid support plate which is fixed in a stationary manner, and electromagnetic solenoid coil which is fixed to the electromagnetic solenoid support plate and through which direct current flows as power is supplied from the DC power supply unit;
        a moving portion which is connected to the elastic body, and can move in a rotation axis direction of the rotor shaft depending on a conduction state and non-conduction state of the electromagnetic solenoid coils; and
        a connecting portion that connects the moving portions and the to-be-driven object to allow each of the to-be-driven object and the moving portions of the electromagnetic solenoids to operate integrally.

4. The electromagnetic pump compensation power supply apparatus according to claim 3, wherein:
    the drive mechanism further includes:
        a fulcrum stage that is fixed in a stationary manner, and
        a lever rod that is so supported as to be able to rotate around a fulcrum fixed to the fulcrum stage, with a length of a portion thereof between the fulcrum and the moving portion of the electromagnetic solenoid sufficiently longer than a length of a portion thereof between the fulcrum and other end; and
    the moving portion can move with a greater force in a direction of rotation axis of the rotor shaft because of operating integrally through the lever rod depending on a conduction state and non-conduction state of the electromagnetic solenoid coil.

5. The electromagnetic pump compensation power supply apparatus according to claim 3, wherein
    the DC power supply unit includes:
        a DC supply line rectifier that converts AC power from the AC power line into DC power; and
        a DC supply line breaker that is electrically connected in series to the DC supply line rectifier, and is placed on a side of the electromagnetic solenoid coil, and cuts off supply of DC power to the electromagnetic solenoid coil.

6. The electromagnetic pump compensation power supply apparatus according to claim 3, wherein
the DC power supply unit includes:
- a DC supply line rectifier that is disposed on a path that branches from the synchronous machine side power supply line and extends to the electromagnetic solenoid coil, and converts AC power from the synchronous machine side power supply line into DC power; and
- a breaker that is connected to an output side of the DC supply line rectifier, and cuts off supply of DC power to the electromagnetic solenoid coil.

7. The electromagnetic pump compensation power supply apparatus according to claim 1, wherein
the DC power supply unit includes:
- a step-down transformer that lowers voltage of AC power from the AC power line;
- a DC power supply apparatus that converts AC power whose voltage is lowered by the step-down transformer into DC power;
- a DC supply line breaker that cuts off direct current from the DC power supply apparatus;
- a current transformer that is placed on a power supply line of the power supply unit of the electromagnetic pump, and detects current of the power supply unit;
- a potential transformer that is placed on a power supply line of the power supply unit of the electromagnetic pump, and detects voltage of the power supply unit; and
- a power factor control unit that receives a current signal as input from the current transformer and a voltage signal from the potential transformer during normal operation, and outputs a control signal to the DC power supply apparatus.

8. An electromagnetic pump compensation power supply apparatus that is electrically connected to an AC power line on a downstream side of a power supply line breaker of a power supply unit of an electromagnetic pump, improves a power factor during normal operation, and supplies power to the electromagnetic pump at a time of loss of AC power supply to the electromagnetic pump, the electromagnetic pump compensation power supply apparatus comprising:
- a rotor shaft that rotates around an axis;
- a flywheel that stores rotation energy and is fixed to the rotor shaft;
- an exciter rotor winding that is fixed to the rotor shaft;
- a rotating rectifier that is fixed to the rotor shaft, and converts alternate current generated on the exciter rotor winding into direct current;
- a winding type synchronous machine rotor winding that is fixed to the rotor shaft, and receives direct current supplied from the rotating rectifier;
- a winding type synchronous machine stator winding that is fixed in a stationary manner so as to face the winding type synchronous machine rotor winding, constitutes a winding type synchronous machine along with the winding type synchronous machine rotor winding, and converts rotational energy into electrical energy and electrical energy into rotational energy;
- an exciter stator permanent magnet apparatus that includes
  - an exciter stator permanent magnet, which constitutes an exciter along with the exciter rotor winding, and can switch between two states, which are non-excited state and excited state,
  - a magnetic shield unit that can move between two positions, which are an intervening position between the exciter rotor winding and the exciter stator permanent magnet and a non-intervening position that is away from the intervening position, and
  - an elastic body configured to impart a restoring force to move the magnetic shield unit in a predetermined direction; and
- a synchronous machine side power supply line that connects the winding type synchronous machine stator winding and the AC power line on a downstream side of the power supply line breaker; and
- a DC power supply unit that uses, as power source, the same AC power line that is a power source for the electromagnetic pump power supply unit, and is configured to convert alternate current into direct current and configured to supply direct current to a drive mechanism and cut off a supply of the direct current, wherein the drive mechanism is configured to generate an opposing force against the restoring force of the elastic body and to lose the opposing force as the supply of the direct current is cut off,
the exciter stator permanent magnet is fixed in a stationary manner so as to face the exciter rotor winding,
the elastic body is fixed in a stationary manner, and forces the magnetic shield unit, which is a to-be-driven object, toward the middle position, and
the drive mechanism is fixed in a stationary manner, and generates the opposing force against the restoring force of the elastic body in such a way as to move the magnetic shield unit to the non-intervening position.

9. An electromagnetic pump system comprising:
an electromagnetic pump;
a power supply unit of the electromagnetic pump, the power supply unit including: an inverter apparatus which converts power from an AC system bus into AC power having predetermined frequency and voltage to supply to the electromagnetic pump, and a power supply line breaker which is connected to an output side of the inverter apparatus and cuts off AC power;
an electromagnetic pump compensation power supply apparatus that is electrically connected to the electromagnetic pump on an electromagnetic pump's side of the power supply line breaker, and improves a power factor during normal operation, and supplies power to the electromagnetic pump at a time of loss of AC power supply to the electromagnetic pump;
wherein
the electromagnetic pump compensation power supply apparatus includes:
- a rotor shaft that rotates around an axis,
- a flywheel that stores rotation energy and is fixed to the rotor shaft,
- an exciter rotor winding that is fixed to the rotor shaft,
- a rotating rectifier that is fixed to the rotor shaft, and converts alternate current generated on the exciter rotor winding into direct current,
- a winding type synchronous machine rotor winding that is fixed to the rotor shaft, and receives direct current supplied from the rotating rectifier,
- a winding type synchronous machine stator winding that is fixed in a stationary manner so as to face the winding type synchronous machine rotor winding, constitutes a winding type synchronous machine along with the winding type synchronous machine rotor winding, and converts rotational energy into electrical energy and electrical energy into rotational energy,
- an exciter stator permanent magnet apparatus that includes an exciter stator permanent magnet, which constitutes an exciter along with the exciter rotor winding, and can switch between two states, which are non-excited state and excited state, and an elastic body configured to impart a restoring force to move the exciter stator permanent magnet in a predetermined direction, and a synchronous machine side power supply line that connects the winding type synchronous machine stator winding and an AC power line on a downstream side of the power supply line breaker, and a DC power supply unit that uses, as power source, the same AC system bus that is a power source for the electromagnetic pump power supply unit, and is configured to convert alternate current into direct current and configured to supply direct current to a drive mechanism and cut off a supply of the direct current, the drive mechanism is configured to generate an opposing force against the restoring force of the elastic body and to lose the opposing force as the supply of the direct current is cut off.

10. The electromagnetic pump system according to claim 9, wherein the elastic body is fixed in a stationary manner, and forces the exciter stator permanent magnet, which is a to-be-driven object, toward a facing position; and the drive mechanism is fixed in a stationary manner, and generates the opposing force against the restoring force of the elastic body in such a way as to move the exciter stator permanent magnet to a non-facing position.

11. An electromagnetic pump system comprising:

an electromagnetic pump;

a power supply unit of the electromagnetic pump, the power supply unit including: an inverter apparatus which converts power from an AC system bus into AC power having predetermined frequency and voltage to supply to the electromagnetic pump, and a power supply line breaker which is connected to an output side of the inverter apparatus and cuts off AC power;

an electromagnetic pump compensation power supply apparatus that is electrically connected to the electromagnetic pump on an electromagnetic pump's side of the power supply line breaker, and improves a power factor during normal operation, and supplies power to the electromagnetic pump at a time of loss of AC power supply to the electromagnetic pump, wherein the electromagnetic pump compensation power supply apparatus includes:

a rotor shaft that rotates around an axis, a flywheel that stores rotation energy and is fixed to the rotor shaft, an exciter rotor winding that is fixed to the rotor shaft, a rotating rectifier that is fixed to the rotor shaft, and converts alternate current generated on the exciter rotor winding into direct current, a winding type synchronous machine rotor winding that is fixed to the rotor shaft, and receives direct current supplied from the rotating rectifier, a winding type synchronous machine stator winding that is fixed in a stationary manner so as to face the winding type synchronous machine rotor winding, constitutes a winding type synchronous machine along with the winding type synchronous machine rotor winding, and converts rotational energy into electrical energy and electrical energy into rotational energy, an exciter stator permanent magnet apparatus that includes an exciter stator permanent magnet, which constitutes an exciter along with the exciter rotor winding, and can switch between two states, which are non-excited state and excited state, a magnetic shield unit that can move between two positions, which are an radial-direction middle position between the exciter rotor winding and the exciter stator permanent magnet and a non-middle position that is away from the middle position, and an elastic body configured to impart a restoring force to move the magnetic shield unit in a predetermined direction, and a synchronous machine side power supply line that connects the winding type synchronous machine stator winding and an AC power line on a downstream side of the power supply line breaker, and a DC power supply unit that uses, as power source, the same AC system bus that is a power source for the electromagnetic pump power supply unit, and is configured to convert alternate current into direct current and configured to supply direct current to a drive mechanism and cut off a supply of the direct current, the drive mechanism is configured to generate an opposing force against the restoring force of the elastic body and to lose the opposing force as the supply of the direct current is cut off, the exciter stator permanent magnet is fixed in a stationary manner so as to face the exciter rotor winding, the elastic body is fixed in a stationary manner, and forces the magnetic shield unit, which is a to-be-driven object, toward the middle position, and the drive mechanism is fixed in a stationary manner, and generates the opposing force against the restoring force restoring force of the elastic body in such a way as to move the magnetic shield unit to the non-middle position.

* * * * *